US011064023B2

United States Patent
Luzzatti et al.

(10) Patent No.: US 11,064,023 B2
(45) Date of Patent: Jul. 13, 2021

(54) METHOD FOR ACTIVELY SHARING AVAILABLE BANDWIDTH TO CONSUMER NODES IN A PEER-TO-PEER NETWORK FOR DELIVERY OF VIDEO STREAMS

(75) Inventors: Omer Luzzatti, Tel Aviv (IL); Eran Weiss, Ramat Gan (IL); Shimon Kogan, Kiryat Ono (IL); Jonathan Zion Mozes, Tel Aviv (IL); Jonathan Stern, Tel Aviv (IL)

(73) Assignee: VERIZON MEDIA INC., New York, NY (US)

( * ) Notice: Subject to any disclaimer, the term of this patent is extended or adjusted under 35 U.S.C. 154(b) by 220 days.

(21) Appl. No.: 13/192,209

(22) Filed: Jul. 27, 2011

(65) Prior Publication Data
US 2011/0289218 A1   Nov. 24, 2011

Related U.S. Application Data

(63) Continuation-in-part of application No. 12/871,615, filed on Aug. 30, 2010, now Pat. No. 8,375,129.
(Continued)

(51) Int. Cl.
*H04L 29/08* (2006.01)
*H04L 29/06* (2006.01)

(52) U.S. Cl.
CPC ........ *H04L 67/104* (2013.01); *H04L 65/4076* (2013.01); *H04L 67/1085* (2013.01); *H04L 67/1089* (2013.01)

(58) Field of Classification Search
CPC .................................................. H04L 41/0896
See application file for complete search history.

(56) References Cited

U.S. PATENT DOCUMENTS 6,484,210 B1   11/2002   Adriano et al.
6,650,636 B1   11/2003   Bradshaw et al.
(Continued)

FOREIGN PATENT DOCUMENTS

WO   2007/110865   10/2007
WO   2008/038280   4/2008

OTHER PUBLICATIONS

Francisco de Asis Lopez-Fuentes, et al., "Architecture for Media Streaming Delivery over P2P Networks", Institute of Communication Networks, Media Technology Group, Technische Universitat Munchen, Munich, Germany, Lecture Notes in Computer Science: Advanced Distributed Systems, Aug. 31, 2005, pp. 72-82, vol. 3563/2005, Springer, Berlin/Heidelberg, Germany.
(Continued)

*Primary Examiner* — Huy D Vu
*Assistant Examiner* — Bao G Nguyen
(74) *Attorney, Agent, or Firm* — James J. DeCarlo; Greenberg Traurig, LLP

(57) ABSTRACT

A method for actively allocating available bandwidth to consumer nodes by a resource node delivering time-sensitive multimedia content in a peer-to-peer (P2P) network. The method comprises performing a check if the resource node can allocate bandwidth to at least one additional consumer node from the consumer nodes; selecting at least one consumer node from a list of consumer nodes addressable by the resource node; and sending an availability notification to each of the selected at least one consumer node from the list of consumer nodes.

18 Claims, 5 Drawing Sheets

Related U.S. Application Data which is a continuation-in-part of application No. 12/751,306, filed on Mar. 31, 2010, now Pat. No. 8,326,992, which is a continuation-in-part of application No. 12/473,006, filed on May 27, 2009, now Pat. No. 8,051,194.

(56) References Cited

U.S. PATENT DOCUMENTS

| | | | |
|---|---|---|---|
| 6,665,292 | B1 | 12/2003 | Bradshaw et al. |
| 6,674,731 | B1 | 1/2004 | Bradshaw et al. |
| 6,963,590 | B1 | 11/2005 | Mann et al. |
| 6,983,326 | B1 | 1/2006 | Vigue et al. |
| 7,062,555 | B1 | 6/2006 | Kouznetsov et al. |
| 7,174,385 | B2 | 2/2007 | Li |
| 7,194,757 | B1 | 3/2007 | Fish et al. |
| 7,209,973 | B2 | 4/2007 | Tormasov et al. |
| 7,323,073 | B2 | 1/2008 | Shao et al. |
| 7,391,767 | B2 | 6/2008 | Lee et al. |
| 7,650,620 | B2 | 1/2010 | Fish et al. |
| 7,664,020 | B2 | 2/2010 | Luss |
| 7,672,235 | B1 | 3/2010 | Lian et al. |
| 7,742,504 | B2 | 6/2010 | Zimmerman et al. |
| 7,827,458 | B1 | 11/2010 | Salsbury et al. |
| 7,933,557 | B1* | 4/2011 | Townley et al. ........... 455/67.11 |
| 7,945,694 | B2 | 5/2011 | Luzzatti et al. |
| 2002/0028679 | A1* | 3/2002 | Edwards ............... H04W 28/20 455/452.2 |
| 2002/0075844 | A1* | 6/2002 | Hagen ................ H04L 63/0442 370/351 |
| 2002/0143945 | A1* | 10/2002 | Shahabuddin ...... H04L 67/1008 709/226 |
| 2002/0161898 | A1 | 10/2002 | Hartop et al. |
| 2003/0112804 | A1* | 6/2003 | Kamarainen .......... H04H 60/91 370/390 |
| 2004/0125816 | A1 | 7/2004 | Xu et al. |
| 2004/0236863 | A1 | 11/2004 | Shen et al. |
| 2005/0172029 | A1* | 8/2005 | Burke ................... G06F 9/5027 709/232 |
| 2005/0216559 | A1 | 9/2005 | Manion et al. |
| 2006/0007947 | A1 | 1/2006 | Li et al. |
| 2006/0031537 | A1* | 2/2006 | Boutboul ................ H04L 67/10 709/228 |
| 2006/0092857 | A1* | 5/2006 | Ansari ................... H04L 45/02 370/254 |
| 2006/0224687 | A1 | 10/2006 | Popkin et al. |
| 2006/0242315 | A1 | 10/2006 | Nichols |
| 2006/0268767 | A1* | 11/2006 | Sato et al. .................... 370/328 |
| 2007/0067296 | A1* | 3/2007 | Malloy ................ H04L 41/145 |
| 2007/0211677 | A1 | 9/2007 | Laroia et al. |
| 2008/0112315 | A1 | 5/2008 | Hu et al. |
| 2008/0134258 | A1 | 6/2008 | Goose et al. |
| 2008/0160911 | A1 | 7/2008 | Chou et al. |
| 2008/0208976 | A1* | 8/2008 | Chapalamadugu ... H04L 67/104 709/205 |
| 2009/0165068 | A1 | 6/2009 | Chang et al. |
| 2009/0182815 | A1* | 7/2009 | Czechowski, III ......................... H04L 67/1076 709/206 |
| 2010/0011103 | A1* | 1/2010 | Luzzatti et al. ............. 709/226 |
| 2010/0088422 | A1 | 4/2010 | Weiss et al. |
| 2010/0094968 | A1 | 4/2010 | Zuckerman et al. |
| 2011/0064079 | A1* | 3/2011 | Lim et al. .................... 370/390 |

OTHER PUBLICATIONS

Eckehard Steinbach, et al., "Adaptive Playout for Low Latency Video Streaming", Information Systems Laboratory, Department of Electrical Engineering, Stanford University, Proceedings, 2001 International Conference on Image Processing, Oct. 7-10, 2001, pp. 962-965, vol. 1.

Xinyan Zhang, et al., "CoolStreaming/DONet: A Data-Driven Overlay Network for Efficient Live Media Streaming", pp. 1-14, IEEE Infocom '05, Miami, FL., USA, Mar. 2005.

Mohamed Hefeeda et al., "Promise: Peer-to-Peer Media Streaming Using CollectCast"; Proceedings of the 11th ACM International Conference on Multimedia; ACM Multimedia 2003, Berkeley, CA; Nov. 4, 2003.

\* cited by examiner

METHOD FOR ACTIVELY SHARING AVAILABLE BANDWIDTH TO CONSUMER NODES IN A PEER-TO-PEER NETWORK FOR DELIVERY OF VIDEO STREAMS

CROSS-REFERENCE TO RELATED APPLICATIONS

This patent is a continuation-in-part (CIP) of U.S. patent application Ser. No. 12/871,615 filed Aug. 30, 2010, which is a continuation-in-part of U.S. patent application Ser. No. 12/751,306 filed Mar. 31, 2010, which is a CIP of U.S. application Ser. No. 12/473,006, filed on May 27, 2009, the contents of which are herein incorporated by reference.

TECHNICAL FIELD

The present invention relates generally to video content delivery in a peer-to-peer network, and more specifically to the generation of bandwidth availability notifications to consumer nodes from resource nodes and responses thereto.

BACKGROUND OF THE INVENTION

The ubiquity of the Internet enables new techniques adapted to enable direct distribution of multimedia files and real-time media streaming to end-users in an electronic format. The advantages associated with electronic distribution allow media content providers to establish global distribution systems for digital content. Furthermore, new compression algorithms, designed specifically for multimedia data, dramatically reduce the bandwidth and storage space required for the electronic distribution of multimedia data. This, together with the availability of broadband communication, encourages content providers to adopt the Internet as an alternate distribution system complementing the conventional distribution systems (e.g., cable or satellite TV).

Peer-to-peer (P2P) or grid networks enable the distribution of media between users without using server centric solutions. As an example, P2P file sharing systems are well known in the industry and use a very efficient technology to deliver media. Examples for such P2P systems are BitTorrent® and Gnutella. However, these systems do not distribute the content in real-time. Rather, a user can download the content (files) and view it only when the download has completed, i.e., a user cannot view the file while downloading it.

Recently, new systems for real-time streaming over P2P networks have been developed. Examples for such systems may be found in "A Data Driver Overlay Network for Efficient Live Media Streaming" by Zhang et al. and in "P2P Media Streaming", by Hefeeda et al., both of which are incorporated herein by reference merely for the useful understanding of the background of the invention. Real-time streaming systems fail to fully utilize the network's resources, as they do not consider the asymmetric nature of the nodes (peers) in a typical Internet protocol (IP) network. Generally, such systems consider the upload bandwidth of nodes as equal to the download bandwidth. This is rarely the case in IP networks, such as asymmetric digital subscriber line (ADSL) and cable based networks, as in most cases a node's upload bandwidth is half or less of the bandwidth of the download.

Another type of a real-time P2P network for distributing media can be found in PCT application number PCT/IL2007/000392 (now U.S. Pat. No. 7,945,694) entitled "Realtime Media Distribution in a P2P Network", by Omer Luzzatti et al. (hereinafter "Luzzatti") which is assigned to common assignee and incorporated herein by reference merely for the useful understanding of the background of the invention. Luzzatti discloses a real-time P2P network where nodes in the network can act in the role of 'amplifiers' to increase the total available bandwidth made available in the network, thus improving the quality of the media consumed by the viewers. Each viewer connects to a plurality of amplifiers in order to receive the overall necessary bandwidth that is capable of providing the full content of a video stream.

Generally, consumer nodes (e.g., viewers) seek resource nodes (e.g., amplifiers) for the purpose of receiving information with respect to data items the consumer node may need. However, typically there are many more consumer nodes than resource nodes in a given network topology. Thus, it may become a time consuming task to identify those resource nodes to which a consumer node can connect to. It would be therefore advantageous to find a solution that would lead to a faster convergence in the process of matching consumer nodes to resource nodes in the P2P network.

SUMMARY OF THE INVENTION

Certain embodiments disclosed herein include a method for actively allocating available bandwidth to consumer nodes by a resource node delivering time-sensitive multimedia content in a peer-to-peer (P2P) network. The method comprises performing a check if the resource node can allocate bandwidth to at least one additional consumer node from the consumer nodes; selecting at least one consumer node from a list of consumer nodes addressable by the resource node; and sending an availability notification to each of the selected at least one consumer node from the list of consumer nodes.

Certain embodiments disclosed herein also include a resource node for delivering time-sensitive multimedia content in a peer-to-peer (P2P) network. The resource node includes a first interface to at least a first consumer node; a second interface to a source of the time-sensitive multimedia content to be distributed to the at least first consumer node requiring a predetermined bandwidth of the first interface; and a processor to determine when the resource node is not utilizing the predetermined bandwidth and is capable of providing at least a portion thereof to at least a second consumer node through the first interface and sending an availability notification to the at least second consumer node when the portion of the predetermined bandwidth is available.

Certain embodiments disclosed herein also include a peer-to-peer (P2P) network for delivering time-sensitive multimedia content. The network comprises at least one consumer node connected to a network; and at least one resource node connected to the network and enabled to deliver the time-sensitive multimedia content to the at least consumer node over the network, the resource node determines when it has available bandwidth and sends at least an availability notification to the at least one consumer node, wherein the at least one consumer node determines, upon receiving the availability notification, if the available bandwidth is required and initiates a connection for receiving of at least a portion of the time-sensitive multimedia content from the at least resource node.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
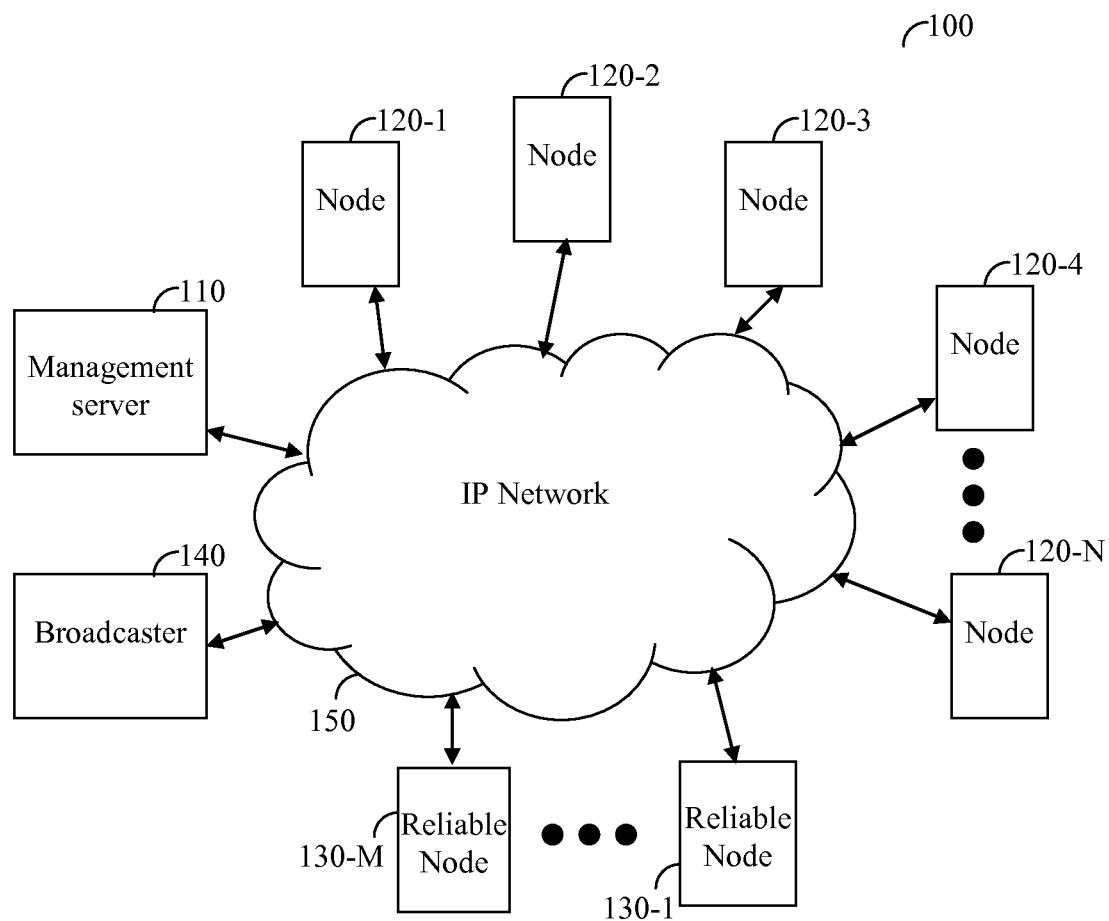
FIG. 1 is a diagram of a P2P network used to describe certain embodiments of the invention.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

According to certain exemplary embodiments of the invention, in a peer-to-peer (P2P) network, consumer nodes (e.g., viewers) receive video streams from one or more resource nodes (e.g., amplifiers). Occasionally there is a need to access a reliable node to overcome deficiency in the supply of video streams or equations representative thereof. If such access is above a threshold value, the consumer node may request an additional quota of resource nodes. Reduction in resource nodes happens if, for example, the condition for adding resource nodes is not met and it is identified that there is at least a redundancy over a predetermined threshold of received video streams or equations representative thereof.

FIG. 1 shows a non-limiting and exemplary block diagram of a P2P network 100 used to describe certain embodiments of the invention. The P2P network 100 includes a plurality of nodes (peers) 120-1 through 120-N (collectivity referred to as nodes 120), reliable nodes 130-1 through 130-M (collectivity referred to as nodes 130), and a broadcaster 140, all of which communicate with each other over an Internet protocol (IP) network 150. The P2P network 100 further includes a management server 110. The management server 110 may comprise a central processing unit (CPU) coupled to a memory (both are not shown). The memory contains instructions that when executed by the CPU allows for the management of the P2P network 100 in general, and in particular the allocation of at least resource nodes 120 to a broadcast channel in accordance with the principles of the invention discussed herein below in greater detail.

The P2P network 100 is utilized to distribute content in several parallel (and alternative) "channels". For example, the P2P network 100 may distribute several unrelated channels (e.g., TV-like channels) of real-time streaming media, with viewers who can choose to view one particular stream at a time. In an embodiment of the invention, at least two reliable nodes 130 are installed in the P2P network 100. Further, while a single broadcaster 140 is shown in FIG. 1, a plurality of broadcasters may be coupled to IP network 150 without departing from the scope of the invention.

The nodes 120 and reliable nodes 130, distributing the content of a particular channel, constitute a "channel swarm". The nodes 120 may be, but are not limited to, personal computers, servers, smart phones, tablet computers, portable media devices, media control devices, set-up boxes, or any other device capable of exchanging data with other nodes connected to it. A node (120 or 130) may also refer to a module of a system, such as a media player. Each node 120 can act as a consumer-node and/or a resource-node. Typically, reliable nodes 130 are used only for the purpose of providing content and such nodes receive content from the broadcaster 140.

In an embodiment of the invention, in a typical configuration of the P2P network, the reliable nodes 130 are placed at central points of the IP network 150 that are considered to be valuable for the distribution of data. For example, a certain geographical area (also referred to herein as a zone, even though it should be noted that a zone may also be other partitions of nodes), for example, a town may have one or two reliable nodes 130 in general network proximity to the nodes 120 it may serve. A reliable node 130 may be relied to provide a consistent bandwidth and be generally available to the nodes it serves, unlike the other resource nodes, as explained below, which may be available or unavailable, or change bandwidth, over relatively short periods of time.

A consumer node, also referred to as an acceptor or a viewer, is a node 120-$c$ (where 'c' is an integer greater than or equal to 1) that belongs to an end-user who wants to watch a channel (i.e., to consume the real-time multimedia content). According to an embodiment of the invention, each consumer-node 120-$c$ is constrained to join one or more channel-swarms as determined by the end-user, and must receive a complete, consumable stream of the real-time content. An end-user can view media content broadcast in a channel on a display connected to the consumer-node. This includes, but is not limited to, a TV screen connected to a set-up box, a monitor connected to a personal computer, a portable multimedia device, and the like. It should be noted that a consumer node may also operate as a resource node, or a donor, to another node 120 of the network 150.

A resource node is a node 120-$r$ (where 'r' is an integer greater than or equal to 1) with an available upload bandwidth that can be contributed to the one or more channel-swarms. In accordance with one embodiment, a resource-node 120-$r$ may be a dedicated network device that shares its bandwidth, but does not consume the multimedia content. Such nodes (devices) are typically installed by service providers, but may also be nodes that are otherwise consumer nodes but are presently not used for viewing of video streams. A resource-node 120-$r$ may be also an amplifier as described in greater detail in Luzzatti. It should be noted that different resource nodes 120-$r$ may have different capabilities, and in particular may be differently capable of providing resources to different consumer-nodes. The allocation of particular resource nodes 120-$r$ to a channel should be chosen to guarantee a certain quality of service, while minimizing the overhead associated with joining a channel swarm.

According to an embodiment of the invention, each node 120 may include an interface to connect to the network to enable connectivity to the broadcaster 140 and/or another node(s) in the network. A node 120 may also include a processor (not shown) to perform various tasks when acting as a resource node or as a consumer node. These tasks are discussed in greater detail herein.

Figure 2:
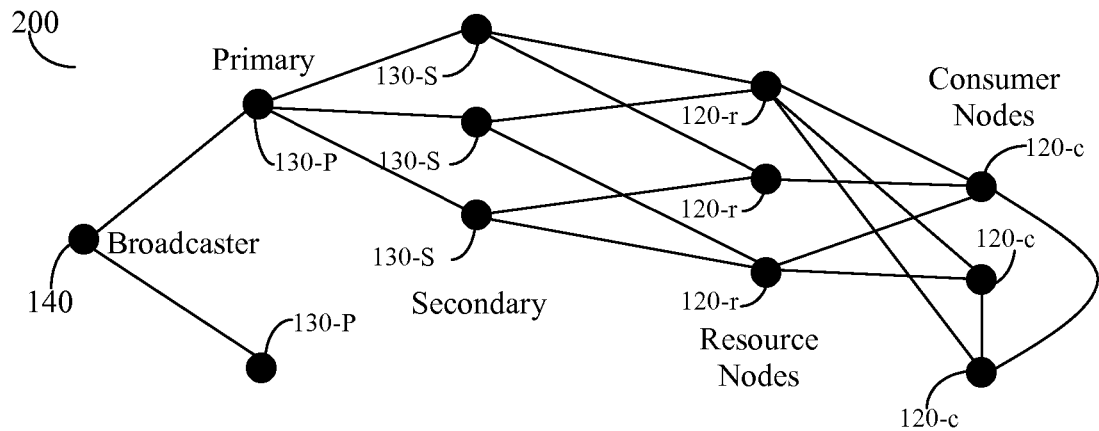
FIG. 2 is a data connectivity diagram describing the connections between the nodes of the P2P network used to deliver video streams.

FIG. 2 provides an exemplary and non-limiting data connectivity diagram 200 describing the connections between the nodes in accordance with an embodiment of the invention. A broadcaster 140 is connected to one or more primary reliable nodes 130-P, each primary reliable node 130-P connected optionally to one or more secondary reliable nodes 130-S. Using this kind of configuration of primary and secondary reliable nodes improves the quality of service (QoS). A consumer-nodes 120-c is connected to other consumer nodes 120-c, to resource nodes 120-r (i.e., nodes which are at least not currently used in a viewing mode), and to secondary reliable nodes 130-S, if those exist, or otherwise, directly to primary reliable nodes 130-P. However, as loads change, i.e., there is a different demand for services while a desire to maintain a quality of service, there is a need to dynamically allocate secondary nodes 130. A static view such as shown in FIG. 2 may not suffice.

Figure 3:
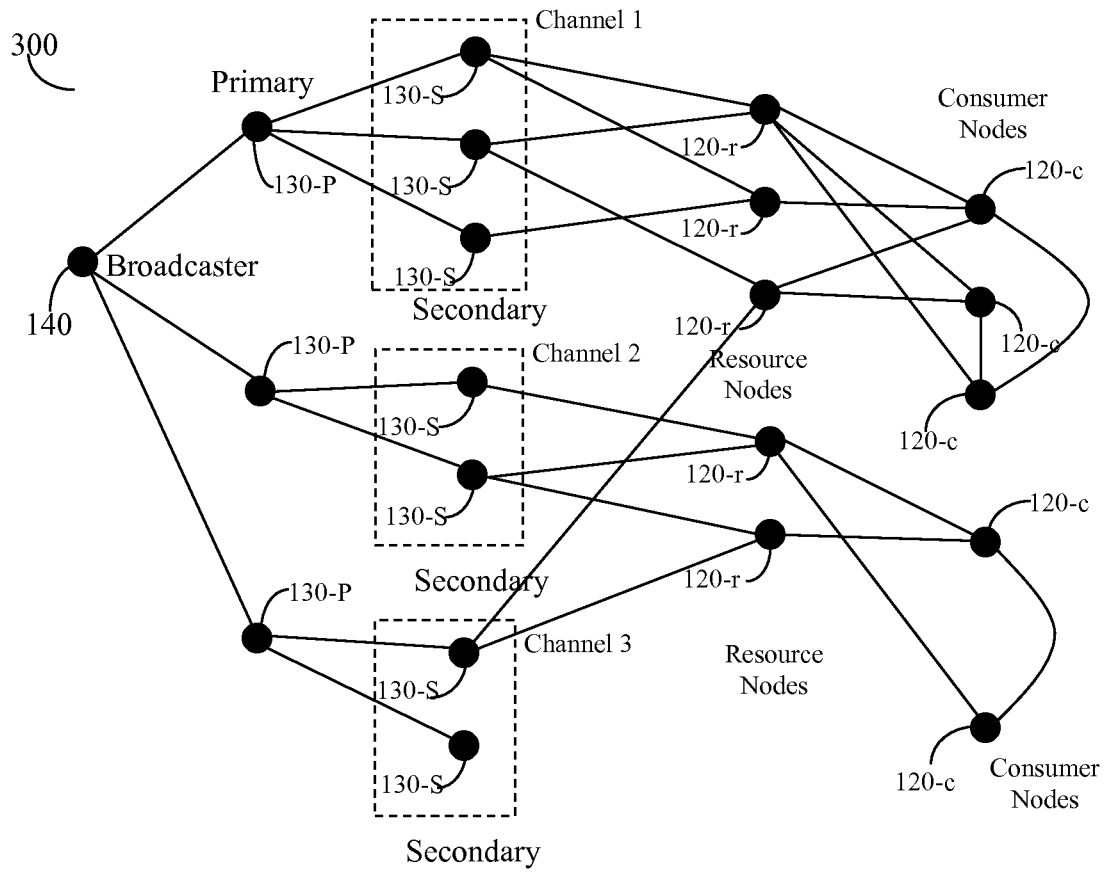
FIG. 3 is an extended data connectivity diagram with channel oriented nodes in accordance with an embodiment of the invention.

FIG. 3 shows an exemplary and non-limiting diagram 300 of an extended data connectivity with channel oriented secondary nodes provided in accordance with an embodiment of the invention. The operation of the broadcaster 140 and the primary reliable nodes 130-P has been discussed above. The secondary reliable nodes 130-S are grouped by channels, each channel having its own group of secondary reliable nodes 130-S. The channel nodes of reliable nodes 130 are allocated based on an initial anticipation of usage of such nodes to ensure the desired level of service quality. While channel orientation is shown herein, other groupings may also be used, including but not by way of limitation, geographical grouping or zones. Moreover, a combination of geographic and channel grouping may be used without departing from the scope of the invention. By balancing the use between channel oriented reliable secondary nodes 130-S, it is possible to effectively and automatically manage the quality of service provided by the system to the consumer nodes 120-c.

As can be seen in the exemplary and non-limiting FIG. 3, there are three channels, Channel 1, Channel 2, and Channel 3, each channel serviced by a reliable primary node 130-P and each having several secondary reliable nodes 130-S. In one embodiment, a reliable primary node 130-P may service more than one channel. Typically, the channel oriented secondary reliable nodes 130-S service their respective resource nodes 120-r and consumer nodes 120-c. However, when there is a need for additional bandwidth, reliable nodes 130 (either primary or secondary) from one channel may be used to kick-in and provide additional bandwidth. This may include full release from one channel and transfer into another channel or, allocating a portion of the designated reliable node 130 to provide a certain amount of bandwidth to the channel requiring additional channel bandwidth. The control over the connectivity of the secondary reliable nodes 130-S is performed, for example, by the management server 110.

In the context of a specific P2P network, each consumer node 120-c is responsible for connecting to a plurality of resource nodes 120-r. These resource nodes 120-r provide the consumer node 120-c with portions of the video streams, either in the form of the actual video data, or, as discussed in the co-pending patent application Ser. No. 12/871,586, in the form of equations that are representative of time sensitive content, e.g., video data. Equations are created by segmenting the content to segments and then to vectors and generating random linear combination equations respective of vectors. A transmitted video stream includes interleaved equations.

Figure 4:
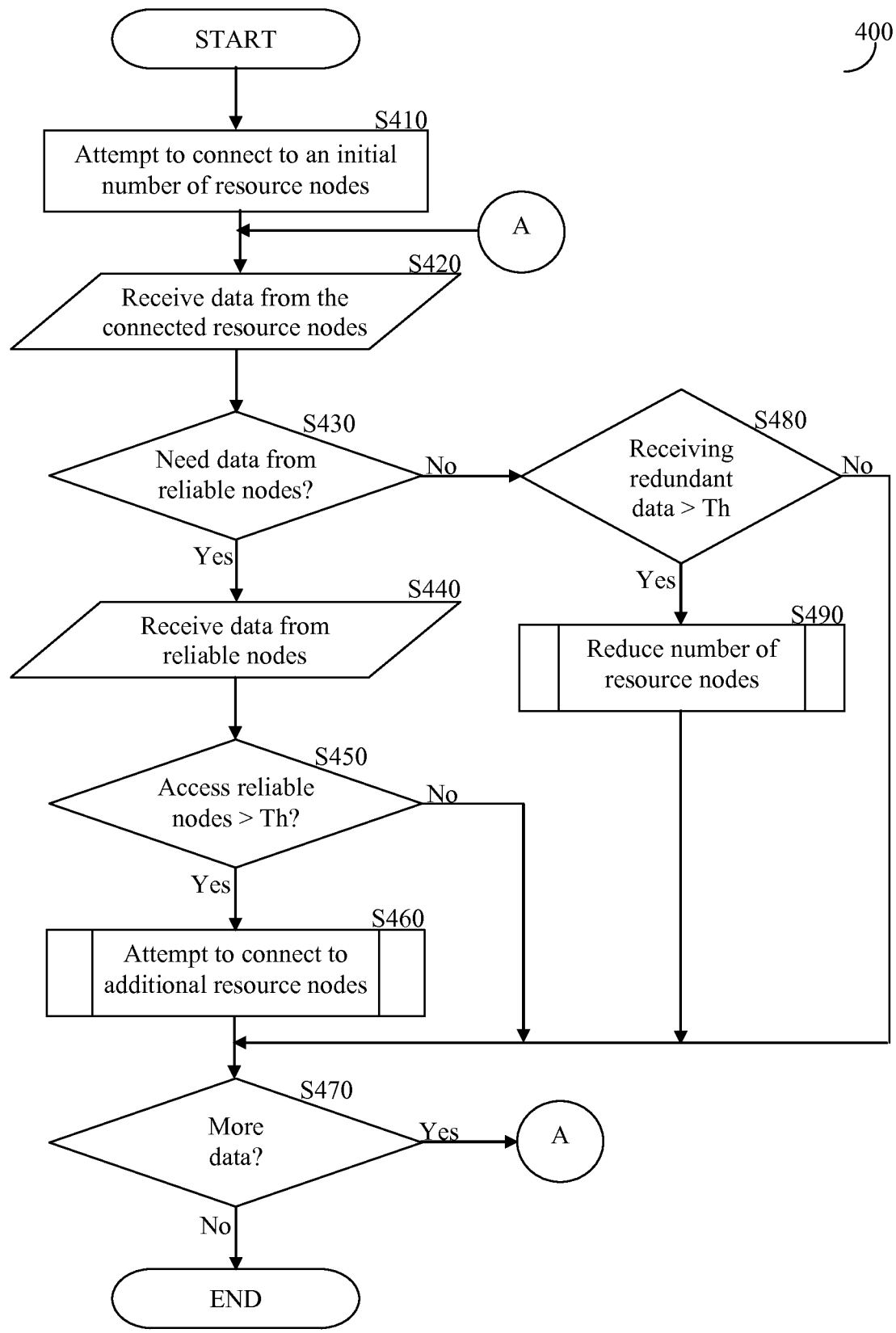
FIG. 4 is a flowchart depicting the adding and subtracting of resource nodes as amplifier nodes from which a consumer node receives the video streams.

A consumer node 120-c, of a P2P network, is instructed to connect to an initial number of resource nodes 120-r, that is expected to provide the consumer node 120-c with a sufficient QoS as defined for the P2P network. According to an embodiment of the invention, the consumer node 120-c makes requests to this initial number of resource nodes 120-r, also referred to as amplifiers, and receives a confirmation from at least part of these consumer nodes 120-r to connect to. It should be appreciated that the management server 110 does not guarantee that the initial number may be achieved by the initial request, or, for that matter, at any time. The consumer node 120-c, once having connected to some resource nodes 120-r, monitors the reception and based thereon decides if it is necessary to request additional resource nodes 120-r or, if it is possible to release one or more resource nodes 120-r, as the case may be. This is described in more detail with respect of FIG. 4 which shows a non-limiting and exemplary flowchart 400 for adding and subtracting of resource nodes as amplifier nodes from which a consumer node receives the video streams according to an embodiment of the invention.

In S410, a consumer node, for example consumer node 120-c, attempts to connect to a plurality of resource nodes, for example resource nodes 120-r. The number of resource nodes to initially connect to is provided as an initial number to the consumer node 120-c. As noted above it is not guaranteed that all the resource nodes respond favorably to the request to connect. In S420, packets of the video stream related to the P2P network are received by the consumer node 120-c. In S430, it is checked if it is necessary for the consumer node 120-c to access one or more reliable nodes 130, and if so execution continues with S440; otherwise, execution continues with S480. A need to receive time sensitive content, such as video streams from one or more reliable nodes 130 may happen, for example, when the consumer node determines that the resource nodes are not capable of providing the video streams necessary within the time left to ensure smooth delivery of the video stream for viewing by a user of the consumer node 120-c.

In S440, the consumer node 120-c receives the necessary video streams from the one or more reliable nodes 130. In S450, it is checked whether the need to access the one or more reliable nodes 130 occurs in a frequency that is above a predetermined threshold and if so, execution continues with S460; otherwise, execution continues with S470. In S460 an attempt is made to connect to an additional number of resource nodes 120-r in order to overcome the need to access the one or more reliable nodes 130. This is performed in order to ensure that the reliable nodes 130 (primary and/or secondary node) are not unnecessarily loaded if it is possible to meet the need from available resource nodes 120-r not currently allocated to the requesting node.

In one embodiment of the invention, a predefined number of additional resource nodes 120-r is attempted to be connected to. The advantage of this approach is that if a large number of consumer nodes 120-c determine that it is necessary to get additional resource nodes 120-r, the management server 110 is not overwhelmed with requests for additional resource nodes 120-*r* and allocation takes place gradually. The predefined quota number may be provided by the management server 110. In another embodiment of the invention, a calculation takes place to estimate the number of additional resource nodes 120-*r* needed to satisfy the QoS conditions for the consumer node 120-*c* and attempts to connect that number to additional resource nodes 120-*r*. The calculation may be performed by either the consumer node 120-*c* or by the management server 110 responsive to a request from the consumer node, thereby allowing the management server 110 to take into account other requests, allocations, and QoS of other consumer nodes 120-*c* within the P2P network.

In S470, it is checked whether additional packets of the video stream are to be received, and if so execution continues with S420; otherwise, execution terminates. It should be noted that execution termination may further include the release of the resource nodes 120-*r* that provide the packets of the video streams to the consumer node that does not need any additional packets.

In S480, it is checked if redundant video information is received by the consumer node, and if so execution continues with S490; otherwise execution continues with S470. In an embodiment of the invention, the stream may be received as video data or interleaved equations. In the former case, the received video data may be repetition of the same content. Thus, in embodiment of the invention it is checked, in S480, if the number of repetitions is above a predetermined threshold (TH) value. In another embodiment of the invention, where equations are received, equations over a predefined threshold (TH) do not contribute to the additional detection of video data.

In S490, the number of resource nodes providing video streams to the consumer nodes is reduced. In one embodiment of the invention, a predefined number of subtracted resource nodes 120-*r* is removed from providing video streams to the consumer node. The predefined quota number for reduction may be provided by the management server 110. In another embodiment of the invention, a calculation takes place to estimate the number of resource nodes 120-*r* that is needed to satisfy the QoS conditions for the consumer node and removes a number of resource nodes 120-*r* that is the difference between the current number of resource nodes used by the consumer node and the newly calculated number of resource nodes actually needed to maintain the QoS for the consumer node but with a reduced number of resource nodes. The calculation may be performed by either the consumer node 120-*c* or by the management server 110 responsive to a request from the consumer node, thereby allowing the management server 110 to take into account other requests, allocations, and QoS of other consumer nodes 120-*c* within the P2P network. It should be further noted that typically a reduction in the number of resource nodes that provide video streams to a consumer node is done more gradually than the adding of such resource nodes, as it is not desirable to adversely affect the QoS for the consumer node by drastically reducing the number of resource nodes that it uses.

To further enhance the performance of the system 100 additional optimization may be made. Specifically, it is noted that at times a resource node, for example a resource node 120-*r*, may have additional bandwidth that is not currently used. That is for example, a resource node 120-*r* that may be capable of serving, for example, ten consumer nodes 120-*c* but may be serving only a fraction of them, for example, two consumer nodes 120-*c*. While the consumer nodes 120-*c* are capable of searching for a resource node 120-*r*, such a search process may take time to focus on one resource node 120-*r* that does have the available bandwidth. Therefore, according to certain embodiments of the invention, a notification is sent by a resource node 120-*r* having such additional bandwidth, to a number of consumer nodes 120-*c* that may need its bandwidth services. The notification is sent to consumer nodes that are not connected to the resource node 120-*r*. In another embodiment, the notification can be sent to already connected consumer nodes to capture additional bandwidth instead of consuming such bandwidth from another resource node. Thus, it should be understood that notifications can be sent by the resource node 120-*r* to new consumer nodes (not connected to the resource node 120-*r*) and to already connected consumer nodes. A consumer node 120-*c* receiving such a request may assess the need for additional bandwidth and respond with a request to connect to the resource node 120-*r*, as discussed in greater detail hereinabove.

In one embodiment, the consumer node 120-*c* may also send a decline notification thereby providing an indication to the notifying resource node 120-*r* that it will not be using the available bandwidth allowing the resource node 120-*r* to potentially use this freed bandwidth to attract another consumer node 120-*c*. It should be further appreciated that the actively sharing of available bandwidth by resource nodes 120-*r*, increases the overall QoS in the P2P network 100, and thereby the quality of the multimedia content consumed by the consumer nodes 120-*c*. As a result, the viewing experience will be enhanced.

Figure 5:
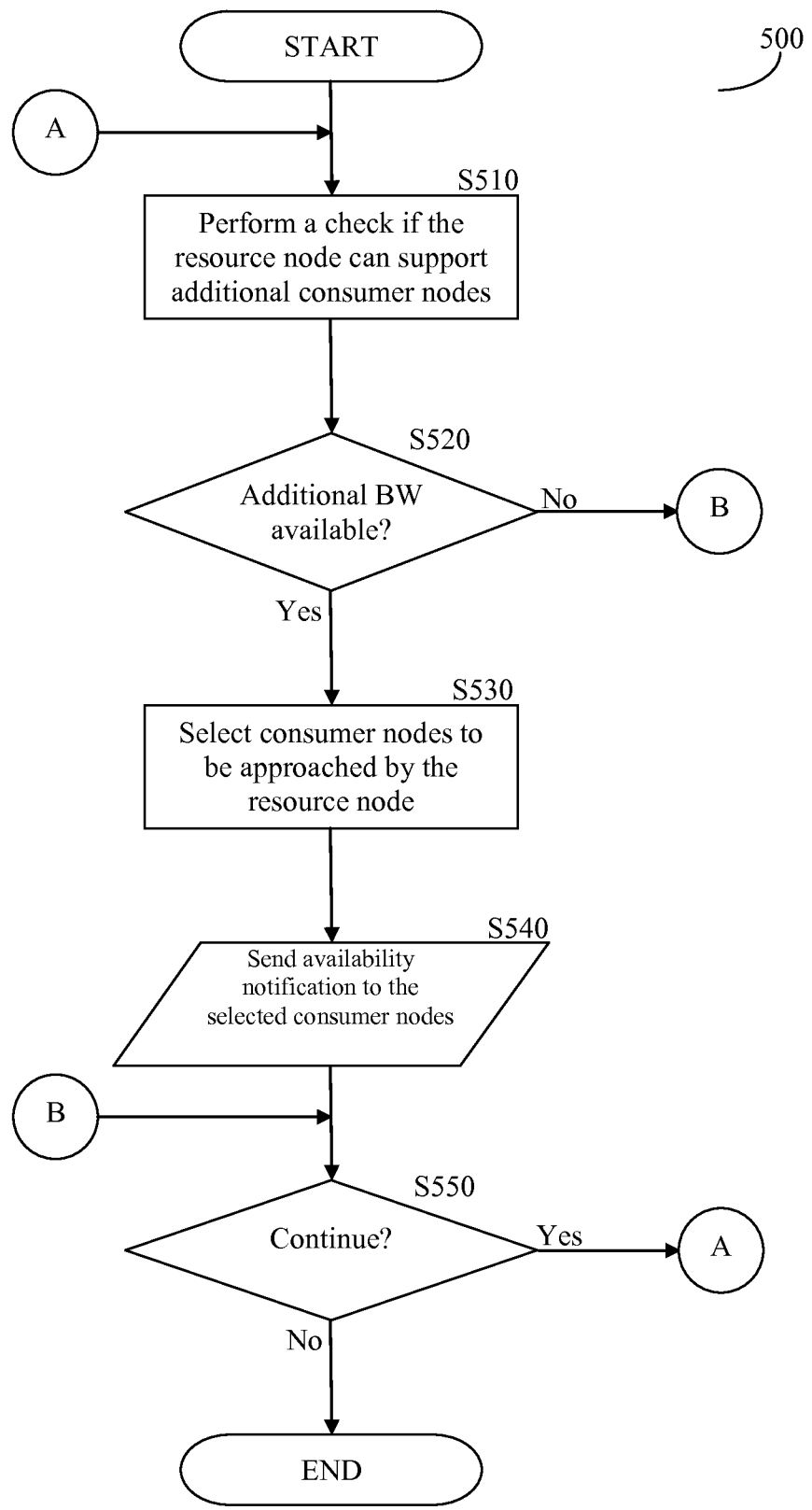
FIG. 5 is a flowchart depicting a notification generated by a resource node having available bandwidth to solicit consumer nodes to request a connection with the resource node.

FIG. 5 is an exemplary and non-limiting flowchart 500 that depicts a notification generated by a resource node having available bandwidth to solicit consumer nodes 120-*c* to request a connection with the resource node 120-*r*. In S510, the resource node 120-*r* determines if it can support additional consumer nodes 120-*c*. Such determination may be performed by computing the overall bandwidth that the resource node 120-*r* can share considering also the current bandwidth allocated to consumer node(s) 120-*c* already connected to the resource node 120-*r*. It should be noted that as the allocated bandwidth may be dynamically changed, the determination made in S510 may be frequently repeated. In another embodiment of the invention, the determination is made based on a dynamic quota value computed by the resource node 130-*r*. The dynamic quota value defines the number of active connections with consumer nodes 120-*c*. If this value is less than a maximum quota value, then the resource node 130-*r* is capable of supporting additional connections. Techniques from computing the quota value are described in U.S. patent application Ser. No. 12/244,756, filed Oct. 2, 2008, now allowed, the content of which is herein incorporated by reference.

In S520 if the resource node 120-*r* determines that there is additional bandwidth available then execution continues with S530; otherwise execution continues with S550. In S530, the resource node 120-*r* selects the consumer nodes 120-*c* to send a notification of its availability to be connected to. In accordance with an embodiment the consumer nodes 120-*c* receiving the notification messages belong to the same channel swarm of the resource node 120-*r*.

If the resource node 120-*r* determines that it can support 'K' additional consumer nodes 120-*c* then notifications are sent to a maximum of 'K' consumer nodes 120-*c*. If the list of consumer nodes 120-*c* that the resource node 120-*r* can connect to is greater than 'K' then various selection criteria may be used, including without limitations random selection or any other selection criteria that may be determined to be useful for the resource node 120-*r*.

In one embodiment of the invention, a larger number than 'K' notification messages are sent, possibly based on some gathered statistics of the actual positive responses typically received by a resource node 120-*r* in response to an availability notification. That is, if it is known that only 90% of the consumer nodes 120-*c* will typically respond with a request to connect to the resource node 120-*r*, then the number of availability notifications sent may be 10% more than the calculated number 'K' in anticipation that not all the consumer nodes 120-*c* will respond with connection requests. If the list of consumer nodes 120-*c* that the resource node 120-*r* can connect to is lesser than or equal to 'K' then the number of notifications sent will match the number of consumer nodes 120-*c*.

In one embodiment, the notification may further include parameters such as, but not limited to, the bandwidth that a resource node 120-*r* may be able to allocate to a consumer node 120-*c*. A consumer node 120-*c* receiving such a notification may prefer connecting to a resource node providing more bandwidth in one case or one that provides the necessary bandwidth in another case.

In S540, an availability notification is sent to the selected consumer nodes 120-*c*. In S550, it is checked whether to continue this process, and if so execution continues with S510; otherwise, execution terminates.

Figure 6:
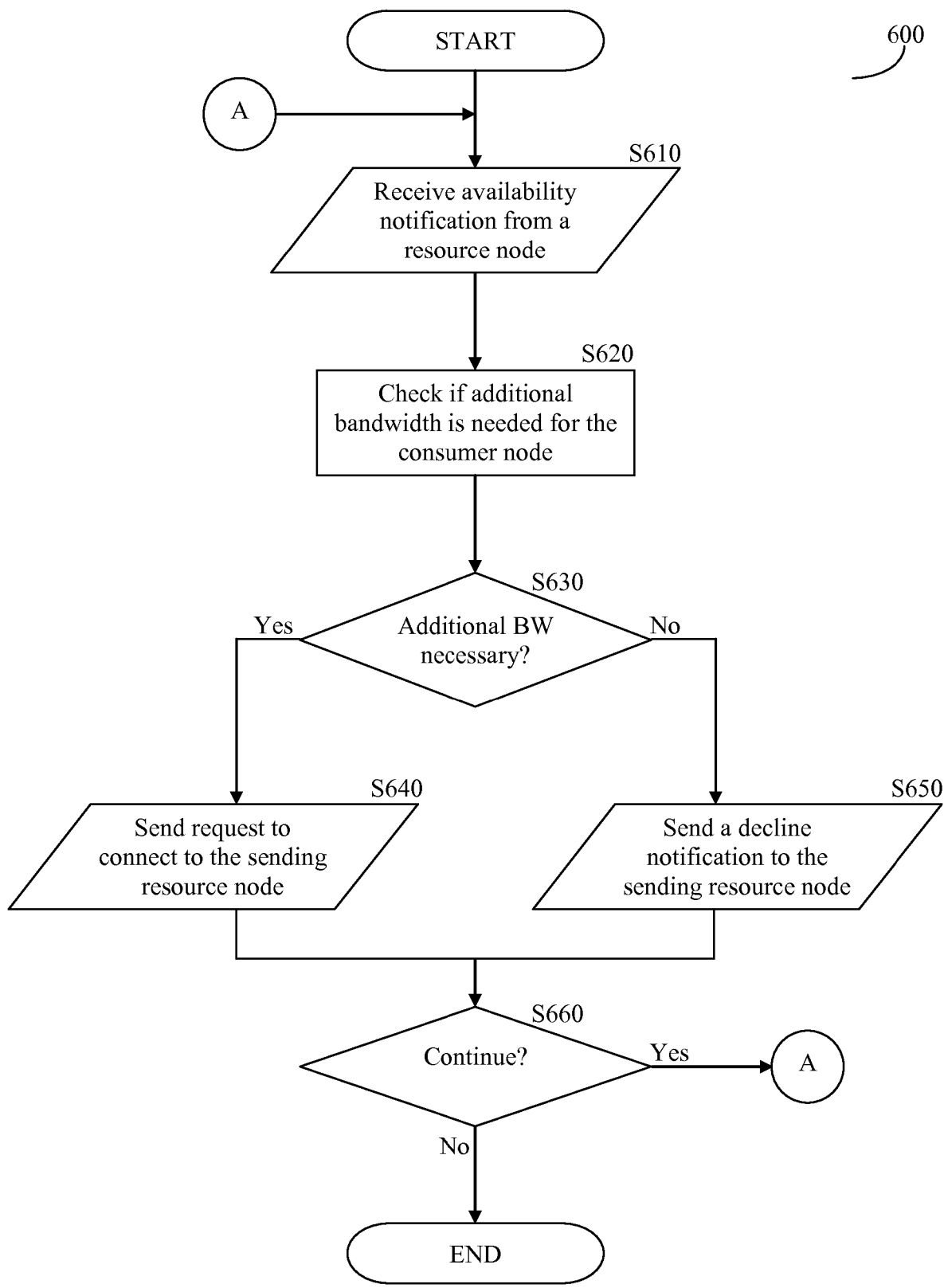
FIG. 6 is a flowchart depicting behavior of a consumer node the receiving of the notification generated by the resource node having available bandwidth and responding thereto.

As noted above the consumer nodes may receive an availability notification from a resource node 120-*r*. FIG. 6 is an exemplary and non-limiting flowchart 600 that depicts the behavior of a consumer node 120-*c* receiving the notification generated by the resource node 120-*r* having available bandwidth and responding thereto. In S610, a consumer node 120-*c* receives a notification from a resource node 120-*r* indicating availability of bandwidth. In S620, the consumer node 120-*c* performs a check to determine if such additional bandwidth is necessary. In S630, if the additional bandwidth is necessary, then execution continues with S640; otherwise, execution optionally continues with S650. Alternatively, when additional bandwidth is not required, execution continues directly with S660.

In S640 a request to connect to the resource node 120-*r* is sent from the consumer node 120-*c*, as discussed in greater detail hereinabove and not repeated herein, after which execution continues with S660. In S650, that as noted is optional, a decline notification is sent from the consumer node 120-*c* to the resource node 120-*r*. The advantage of sending a decline message is that it allows the resource node 120-*r* to more quickly be able to select another consumer node 120-*c* that may benefit from the additional bandwidth. In S660, it is checked whether to continue this process, and if so execution returns to S610; otherwise, execution terminates.

Certain embodiments of the invention may be implemented in hardware, firmware, software or any combination thereof. Moreover, the software is preferably implemented as an application program tangibly embodied on a program storage unit or non-transitory computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method comprising:
   determining, via a computing device, whether a resource node has available bandwidth to allocate to a list of consumer nodes comprising a plurality of consumer nodes in a peer-to-peer (P2P) network, each consumer node in said list of consumer nodes satisfying a quality of service (QoS) for the P2P transfers over the P2P network, said QoS reflecting a dynamically changing, demand-for-services based, respective number of resource nodes that each consumer node of said plurality can connect to as a primary and secondary node connection;
   determining, via the computing device, a number of first consumer nodes from the list of consumer nodes to which an availability notification can be sent, said determination based on each first consumer node satisfying a dynamic quota value associated with each node's active connections, said dynamic quota value corresponding to a maximum allowable quota value indicating a maximum number of connections that the resource node can accept from each first consumer node;
   selecting, via the computing device, a number of second consumer nodes from the first number of consumer nodes based on said second consumer node's being addressable by the resource node;
   sending, via the computing device, the availability notification to each of the selected second consumer nodes;
   receiving, by the computing device, a decline message from at least one second consumer node receiving the availability notification; and
   selecting, by the computing device, in accordance with the QoS, another consumer node from the second consumer nodes to send the availability notification.

2. The method of claim 1, wherein said selection of the second number of consumer nodes is a random selection.

3. The method of claim 1, wherein the selection of the second number of consumer nodes comprises a statistical determination based on statistics of prior connection responses by said second consumer nodes to previous availability notifications.

4. The method of claim 1, further comprising:
   receiving a request to connect to the resource node by at least one second consumer node receiving the availability notification; and
   connecting the resource node to the at least one second consumer node.

5. The method of claim 1, further comprising:
determining whether the dynamic quota value is less than the maximum allowable quota value, wherein the dynamic quota value is periodically computed by the resource node.

6. A non-transitory computer-readable storage medium tangibly encoded with computer-executable instructions, that when executed by a processor associated with a computing device, perform a method comprising:
determining whether a resource node has available bandwidth to allocate to a list of consumer nodes comprising a plurality of consumer nodes in a peer-to-peer (P2P) network, each consumer node in said list of consumer nodes satisfying a quality of service (QoS) for the P2P transfers over the P2P network, said QoS reflecting a dynamically changing, demand-for-services based, respective number of resource nodes that each consumer node of said plurality can connect to as a primary and secondary node connection;
determining a number of first consumer nodes from the list of consumer nodes to which an availability notification can be sent, said determination based on each first consumer node satisfying a dynamic quota value associated with each node's active connections, said dynamic quota value corresponding to a maximum allowable quota value indicating a maximum number of connections that the resource node can accept from each first consumer node;
selecting a number of second consumer nodes from the first number of consumer nodes based on said second consumer node's being addressable by the resource node;
sending the availability notification to each of the selected second consumer nodes;
receiving a decline message from at least one second consumer node receiving the availability notification; and
selecting, in accordance with the QoS, another consumer node from the second consumer nodes to send the availability notification.

7. The method of claim 1, wherein at least one said second consumer nodes belongs to a channel swarm associated with said resource node within said P2P network.

8. The non-transitory computer-readable storage medium of claim 6, wherein said selection of the second number of consumer nodes is a random selection.

9. The non-transitory computer-readable storage medium of claim 6, wherein the selection of the second number of consumer nodes comprises a statistical determination-based on statistics of prior connection responses by said second consumer nodes to previous availability notifications.

10. The non-transitory computer-readable storage medium of claim 6, further comprising:
receiving a request to connect to the resource node by at least one second consumer node receiving the availability notification; and
connecting the resource node to the at least one second consumer node.

11. The non-transitory computer-readable storage medium of claim 6, further comprising:
determining whether the dynamic quota value is less than the maximum allowable quota value, wherein the dynamic quota value is periodically computed by the resource node.

12. The non-transitory computer-readable storage medium of claim 6, wherein at least one said second consumer nodes belongs to a channel swarm associated with said resource node within said P2P network.

13. A computing device comprising:
a processor; and
a non-transitory computer-readable storage medium for tangibly storing thereon program logic for execution by the processor, the program logic comprising:
determination logic executed by the processor for determining whether a resource node has available bandwidth to allocate to a list of consumer nodes comprising a plurality of consumer nodes in a peer-to-peer (P2P) network, each consumer node in said list of consumer nodes satisfying a quality of service (QoS) for the P2P transfers over the P2P network, said QoS reflecting a dynamically changing, demand-for-services based, respective number of resource nodes that each consumer node of said plurality can connect to as a primary and secondary node connection;
determination logic executed by the processor for determining a number of first consumer nodes from the list of consumer nodes to which an availability notification can be sent, said determination based on each first consumer node satisfying a dynamic quota value associated with each node's active connections, said dynamic quota value corresponding to a maximum allowable quota value indicating a maximum number of connections that the resource node can accept from each first consumer node;
selection logic executed by the processor for selecting a number of second consumer nodes from the first number of consumer nodes based on said second consumer node's being addressable by the resource node;
communication logic executed by the processor sending the availability notification to each of the selected second consumer nodes from the second number of the consumer nodes;
reception logic executed by the processor for receiving a decline message from at least one second consumer node receiving the availability notification; and
selection logic executed by the processor for selecting, in accordance with the QoS, another consumer node from the second consumer nodes to send the availability notification.

14. The computing device of claim 13, wherein said selection of the second number of consumer nodes is a random selection.

15. The computing device of claim 13, wherein the selection of the second number of consumer nodes comprises a statistical determination-based on statistics of prior connection responses by said second consumer nodes to previous availability notifications.

16. The computing device of claim 13, further comprising:
receiving logic executed by the processor for receiving a request to connect to the resource node by at least one second consumer node receiving the availability notification; and
connection logic executed by the processor for connecting the resource node to the at least one second consumer node.

17. The computing device of claim 13, further comprising:
determination logic executed by the processor for determining whether the dynamic quota value is less than the maximum allowable quota value, wherein the dynamic quota value is periodically computed by the resource node.

18. The computing device of claim 13, wherein at least one said second consumer nodes belongs to a channel swarm associated with said resource node within said P2P network.

* * * * *